(12) United States Patent
Ishii (10) Patent No.: US 8,897,003 B2
(45) Date of Patent: Nov. 25, 2014

(54) INFORMATION PROCESSING APPARATUS

(71) Applicant: Fujitsu Frontech Limited, Tokyo (JP)

(72) Inventor: Noboru Ishii, Tokyo (JP)

(73) Assignee: Fujitsu Frontech Limited, Tokyo (JP)

( * ) Notice: Subject to any disclaimer, the term of this patent is extended or adjusted under 35 U.S.C. 154(b) by 217 days.

(21) Appl. No.: 13/724,539

(22) Filed: Dec. 21, 2012

(65) Prior Publication Data

US 2013/0194736 A1 Aug. 1, 2013

(30) Foreign Application Priority Data

Jan. 27, 2012 (JP) ................. 2012-014904

(51) Int. Cl.
*G06F 1/16* (2006.01)
*G06F 1/18* (2006.01)

(52) U.S. Cl.
CPC . *G06F 1/18* (2013.01); *G06F 1/181* (2013.01)
USPC .................... 361/679.4; 248/280.11; 439/497; 174/520

(58) Field of Classification Search
USPC .............. 174/3, 2, 4 R, 21 JR, 84 R, 37, 520;
248/70, 123.2, 158, 123.11, 161,
248/125.1, 648, 280.11, 177.1, 122.1,
248/311.2, 183.3, 182.1, 578, 71, 67.5,
248/183.1; 361/679.22, 679.02, 679.05,
361/679.01, 679.06, 679.44, 679.07,
361/679.27, 679.09, 679.26, 679.29,
361/679.21, 679.23, 679.41; 439/345, 62,
439/81, 578, 736, 497, 354, 6, 10, 267, 447,
439/329, 499; 165/254, 67
See application file for complete search history.

(56) References Cited

U.S. PATENT DOCUMENTS

| | | | |
|---|---|---|---|
| 5,552,967 A * | 9/1996 | Seto et al. ...................... | 361/818 |
| 8,090,096 B2 * | 1/2012 | Nitobe et al. ............ | 379/428.01 |
| 8,152,240 B2 * | 4/2012 | Yamada et al. ............... | 297/321 |
| 2005/0041381 A1 * | 2/2005 | Maskatia et al. .............. | 361/683 |
| 2005/0101182 A1 | 5/2005 | Nakamura et al. | |

FOREIGN PATENT DOCUMENTS

| | | |
|---|---|---|
| JP | 2000-274559 | 10/2000 |
| JP | 2005-148931 | 6/2005 |

* cited by examiner

*Primary Examiner* — Hung Duong
(74) *Attorney, Agent, or Firm* — Greer Burns & Crain Ltd.

(57) ABSTRACT

An information processing apparatus 10 connected to a peripheral device through a cable includes a main body unit 20 having a connector on a bottom portion 20a of the main body unit 20, a base unit 40 that is set on the main body unit 20 in a tiltable manner, a tilting unit 60 that turns the main body unit about a vicinity of the bottom portion of the main body unit with respect to the base unit when tilting is performed, and a cable holder 80 that defines a position of the cable in a vicinity of the connector and suppresses movement of the cable accompanying the tilting operation between the defined position and the connector, wherein the cable holder is attached to the tilting unit.

5 Claims, 8 Drawing Sheets

INFORMATION PROCESSING APPARATUS

CROSS REFERENCE TO RELATED APPLICATIONS

This application is based upon and claims the benefit of priority from the prior Japanese Patent Application No. 2012-014904, filed Jan. 27, 2012, the entire contents of which are incorporated herein by reference.

FIELD OF THE INVENTION

The present invention relates to an information processing apparatus for retail stores, represented by point-of-sale (POS) terminals used in stores such as department stores, supermarkets, convenience stores, and the like, and particularly to an information processing apparatus having a foldable display unit to which a cable is connected.

BACKGROUND OF THE INVENTION

Devices have been developed that can tilt a display unit (for example from a standing state to a horizontal state) for information processing apparatuses such as POS terminals so that the operability and visibility of the display unit are secured in various installation environments.

Also, POS terminals need a configuration that can control cables properly when the display unit is tilted because such information processing apparatuses have cables connected to peripheral devices such as a printer, a scanner, a keypad, or the like.

As an example of controlling cables, a structure is proposed in which a clamp is attached to a surface of the main body to which cables are connected, and the clamp has an opening for passing the cables through while keeping the position of the cables (for example, Patent Document 1). Also, a transparent resin cable holder is proposed that stores cables for connecting removable casings (for example, Patent Document 2).

Patent Document 1 (Japanese Laid-open Patent Publication No. 2000-274559)
Patent Document 2 (Japanese Laid-open Patent Publication No. 2005-148931)

SUMMARY OF THE INVENTION

In order to achieve the above object, an information processing apparatus according to the present invention is an information processing apparatus connected to a peripheral device through a cable, including a main body unit having a connector on a bottom portion of the main body unit, a base unit that is set on the main body unit in a tiltable manner and is connected to the connector of the main body unit so that the cable connected to the connector of the main body unit and directed to the peripheral device is passed through to the inside, a tilting unit that turns the main body unit about a vicinity of the bottom portion of the main body unit with respect to the base unit when tilting is performed, and a cable holder that defines a position of the cable in a vicinity of the connector, and suppresses movement of the cable accompanying the tilting operation between the defined position and the connector, wherein the cable holder is attached to the tilting unit.

DETAILED DESCRIPTION OF THE EMBODIMENTS

Figure 1:
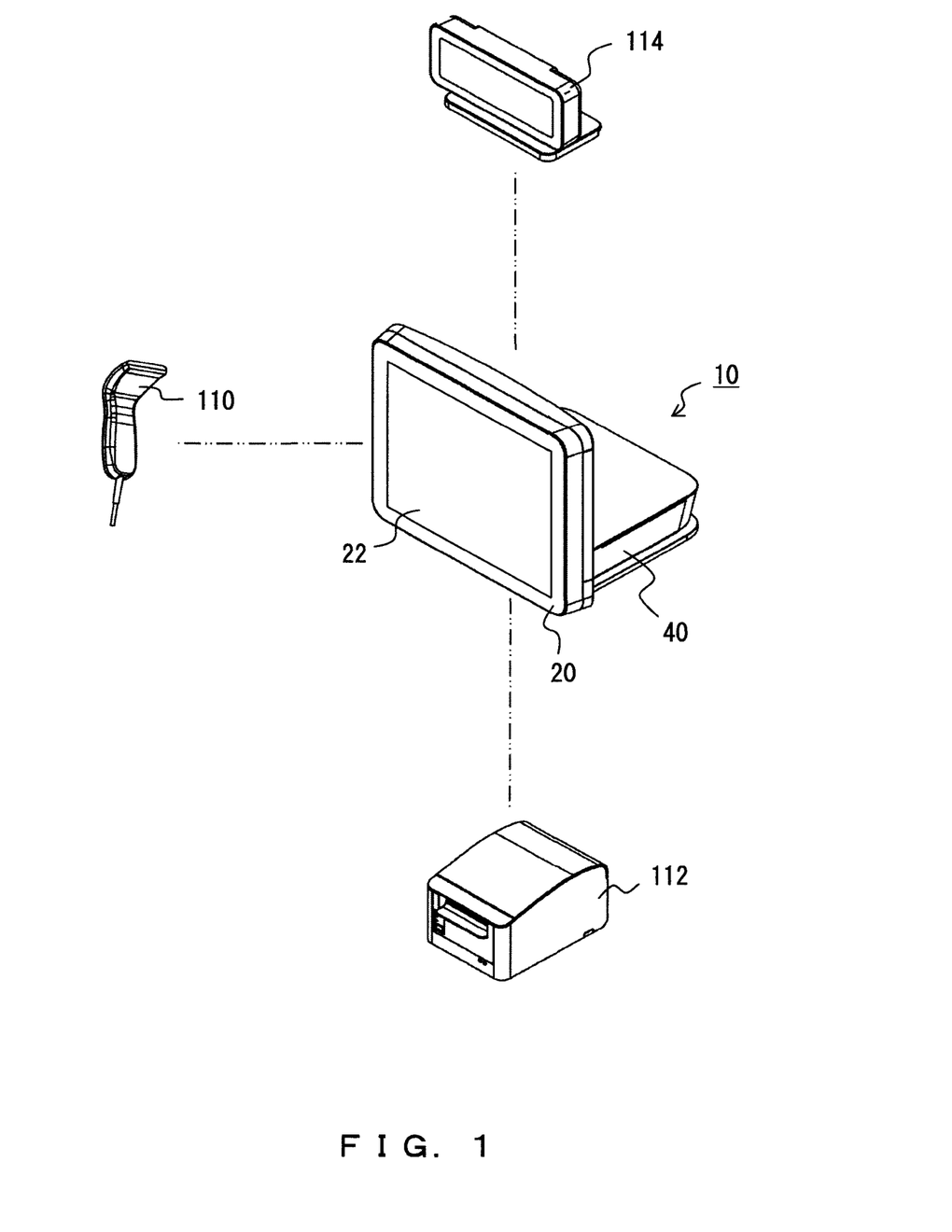
FIG. 1 shows a system including a POS terminal 10 as one information processing apparatus according to embodiments of the present invention, and its peripheral devices.

Hereinafter, embodiments of the present invention will be explained by referring to the drawings. FIG. 1 shows a system including a POS terminal as one information processing apparatuses according to embodiments of the present invention, and its peripheral devices.

A POS terminal 10 is an apparatus widely used in retail stores such as department stores, supermarkets, convenience stores, and the like as an information processing apparatus for sales management, item inventory, or the like.

As representative peripheral devices connected to the POS terminal 10, a scanner 110, a printer 112, and a VFD (Vacuum Fluorescent Display) 114 are shown. The scanner 110 reads bar codes attached to items so as to transmit the codes (management numbers) corresponding to the items to the POS terminal 10. The POS terminal 10 displays the corresponding prices, calculates the total amount in accordance with the codes of the items, and stores this information.

The printer 112 prints receipts of items to be given to customers in accordance with instructions from the POS terminal 10. The VFD 114 is a display unit for customers set on the upper portion of the POS terminal 10. The VFD 114 is set on the POS terminal 10 in a turnable manner so that item prices or the like are displayed to the customers. Also, as a peripheral device, a private code key pad (not shown) or the like may be set. Because the POS terminal 10 may be connected through a LAN to a server that performs the overall control, a plurality of connection cables are connected to the POS terminal 10 in addition to the above peripheral device.

The POS terminal 10 mainly includes a main body unit 20 having a monitor function and a base unit 40 for supporting the main body unit 20. The plane on the near side of the main body unit 20 is a touch panel 22. An LCD is provided to the inner side of the touch panel 22 in order to display operation instruction information for the touch panel and various other types information.

Figure 2:
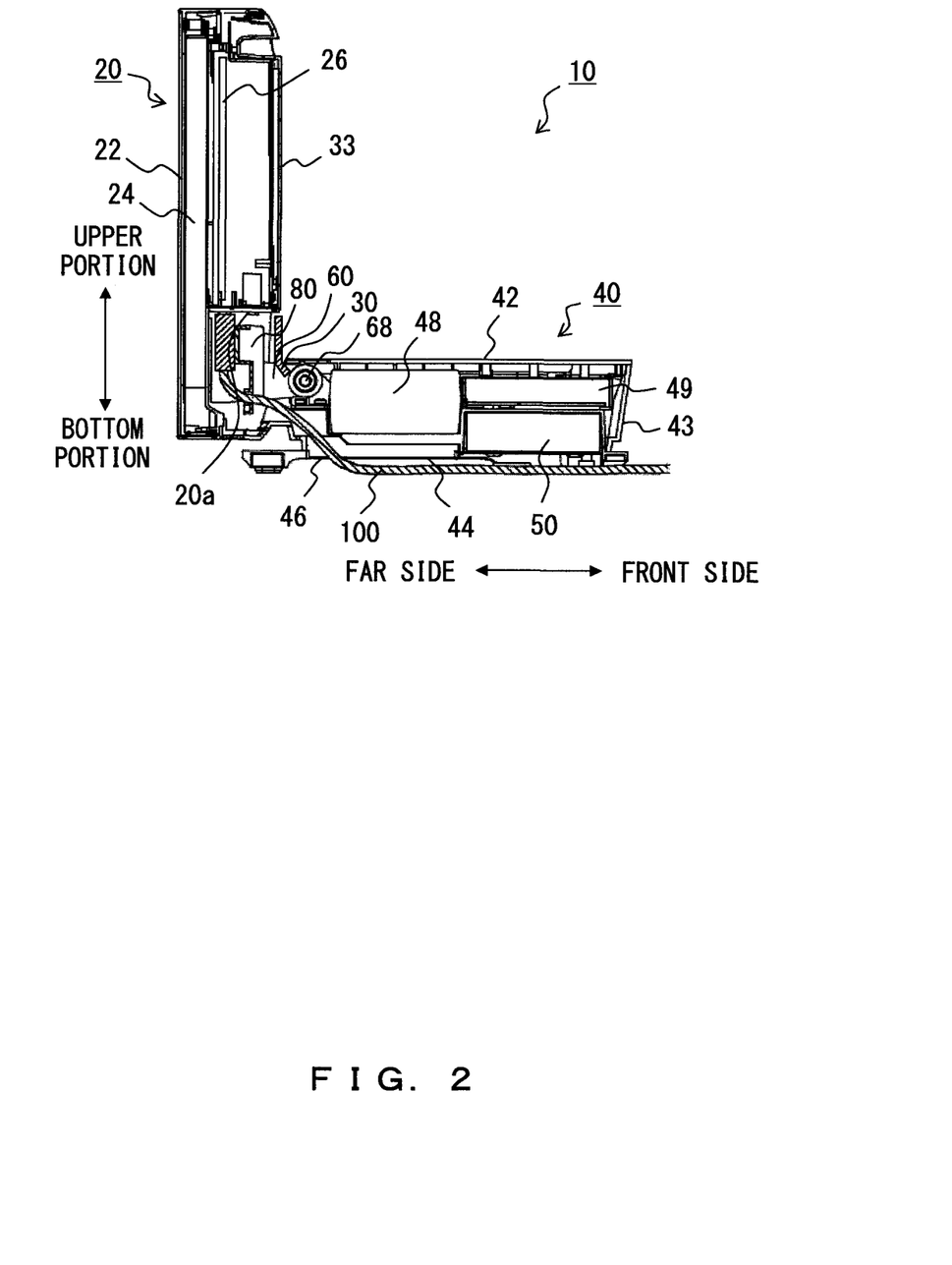
FIG. 2 is a sectional view of the POS terminal 10 with a main body unit 20 standing upright.

FIG. 2 is a sectional view of the POS terminal 10 with the main body unit 20 standing upright. The POS terminal 10 includes the main body unit 20, the base unit 40 serving as a stand for supporting the main body unit 20, and a tilt hinge 60 that is a tilting unit for attaching the main body unit 20 to the base unit 40 in a foldable manner. In the explanations of the base unit 40, the side having the main body unit 20 (the side of the touch panel 22) is referred to as the far side, while the other side is referred to as the front side. Also, in the explanations of the main body unit 20, the expressions upper portion and bottom portion are used with references to the main body unit 20 standing upright. While a folded state is used for explanations in the present embodiment, the scope is not limited to this example, and explanations will also be applied to an apparatus having the main body unit 20 tilted by a prescribed degree (around 30 degrees for example).

The main body unit 20 has approximately a shape of a rectangular solid. In the main body unit 20, the touch panel 22, an LCD 24, a motherboard 26, a camera (not shown), a heat sink (not shown), a discharge fan (not shown), and the like are provided. The touch panel 22 is provided on the plane opposite to the base unit 40. In the touch panel 22, the LCD 24, which is a thin type display device, is provided parallelly to the touch panel 22.

The plane opposite to the touch panel 22 of the main body unit 20 is protected by a rear cover 33. A connector cover 30 is provided to a lower portion of the rear cover 33 (bottom portion side in the drawing). The connector cover 30 is attached to a bottom portion 20a of the main body unit 20 so as to cover connectors mounted on the main body unit 20. The connector cover 30 and the rear cover 33 are items made by resin casting.

The motherboard 26 is provided parallelly to the LCD 24 at a position further inward than the LCD 24 included in the main body unit 20. The motherboard 26 is provided with a memory device for storing information temporarily or for holding information, a control circuit for controlling the touch panel 22 or the LCD 24, and an interface circuit for controlling peripheral devices such as a scanner or the like.

Also, the motherboard 26 is provided with a plurality of connectors to which cables connected to peripheral devices are connected. As types of connectors, USB connectors, LAN connectors, RS232C connectors, IEEE1394 connectors, and the like are possible, and connectors compatible with the cables of peripheral devices are used. The terminals of the connectors are mounted on the bottom of the motherboard 26, and only receptacles (not shown) are exposed to the external environment through a cover provided to the bottom portion 20a of the main body unit 20. In FIG. 2, the connectors (jacks) of the cables 100 are connected to the connectors (receptacles) mounted on the main body unit 20.

A heat sink (not shown) is attached to an element such as a CPU or the like so as to dissipate heat generated by the CPU or the like mounted on the motherboard 26. A discharge fan (not shown) is provided in the vicinity of the heat sink. The discharge fan ventilates air inside the main body unit 20 so as to emit heat radiated from the heat sink to the outside.

The base unit 40 has approximately a shape of a rectangular solid. The outline of the base unit 40 is constituted of a base housing 43 that is in a shape of a box whose top plane is opened, and a top cover 42 covering the top plane of the base housing 43. The top cover 42 and the base housing 43 are made by resin casting. However, they may be made by using other techniques, and may be made of other materials. In the base housing 43, an adapter 48, a power board 49, a battery 50, and the like are provided. The adapter 48 converts, into prescribed DC power, external AC power provided through an AC power cable. The power board 49 converts the DC voltage obtained through the conversion by the adapter 48 into voltages for driving the CPU, the touch panel 22, the LCD 24, etc. of the main body unit 20, and supplies the resultant voltages to respective units in the main body unit 20. The battery 50 is a backup power source to be used when electric power interruptions or the like have stopped the power supply of the AC power. A secondary battery such as, for example, a lithium-ion battery or nickel-hydrogen cell is used as the battery 50.

The base unit 40 has an opening 46 on the far side of a bottom plane unit 44. The opening 46 is a hole through which the cables 100 connected to the bottom portion 20a of the main body unit 20 pass to the bottom plane unit 44 of the base unit 40.

The tilt hinge 60 is a tilting unit for making the main body unit 20 able to be folded to the base unit 40. The main body unit 20 and the base unit 40 are coupled to each other by the tilt hinge 60. The main body unit 20 tilts about tilting shafts 68 of the tilt hinge 60 by about ninety degrees with respect to the base unit 40 so that the position changes from the standing state shown in FIG. 2 to the folded state shown in FIG. 3. The tilting shafts 68 are provided to the far side of the base unit 40 and the bottom portion 20a of the main body unit 20 shown in FIG. 2, and the shaft line runs in the direction orthogonal to the drawing sheet. The position of the connector of the main body unit 20 is in the vicinity of the shaft line of the tilting shafts 68; however, the tilting shafts 68 are provided at the right and left edges so that they do not interfere with the cables 100. The tilt hinge 60 will be described later in detail by referring to FIG. 4.

Also, the tilt hinge 60 is provided with a cable holder 80. The cable holder 80 controls movement of the cables 100 connected to the connector of the motherboard 26. The cables 100 move/deform (for example, fold) around the connector when the main body unit 20 is tilted by the tilting, and this deformation of the cables 100 may apply external stress to the connector, leading to breakage of the connector. The cable holder 80 will be explained in detail later.

The cables 100 pass through the cable holder 80 and enter the opening 46 of the base unit 40 after running below the tilting shafts 68. Further, the cables 100 pass through the opening 46, come out from the bottom plane unit, run forward along the bottom plane unit 44, and are exposed to the outside from the front plane side of the base unit 40.

Also, the cables are used to supply electric power from the base unit 40 to the main body unit 20.

Figure 3:
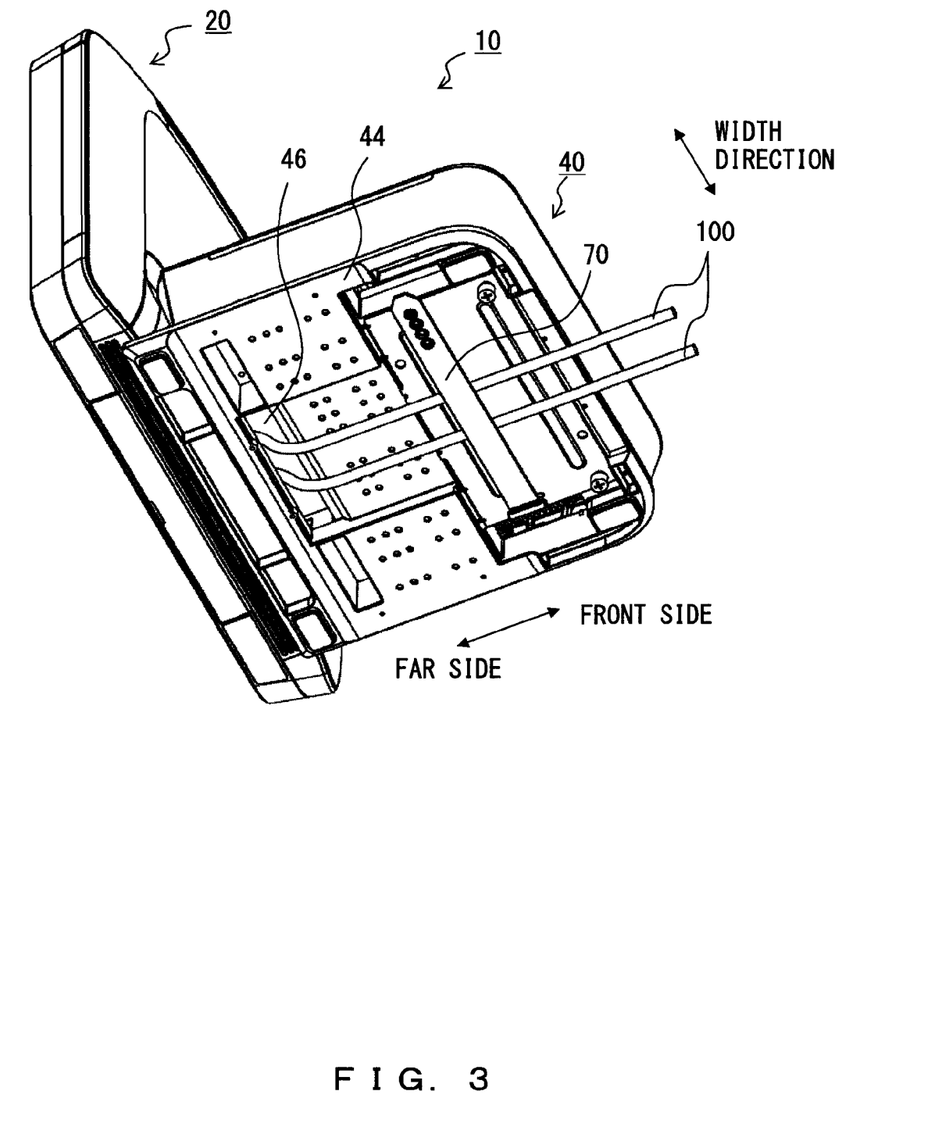
FIG. 3 is a perspective view showing the POS terminal 10 with the main body unit 20 standing upright as seen from the direction of a bottom plane unit 44 of a base unit 40.

FIG. 3 is a perspective view showing the POS terminal 10 with the main body unit 20 standing upright as seen from the direction of the bottom plane unit 44 of the base unit 40. Also, as shown in the figure, the same directions as in FIG. 2 are referred to as the far side and the front side, and the direction orthogonal to them is referred to as the width direction. The opening 46 is provided on the far side of the base unit 40 and at the center in the width direction is a quadrangular hole that is long in the width direction. Further, the bottom plane unit 44 is provided with a cable band 70. The cable band 70 is used to prevent the plurality of cables 100 from tangling when they pass through the bottom plane unit 44. The cable band 70 is a band shaped member provided along the width direction of the base unit 40 so as to control movement of the cables 100 in the width directions by clipping the cables 100 with the bottom plane unit 44.

Figure 4:
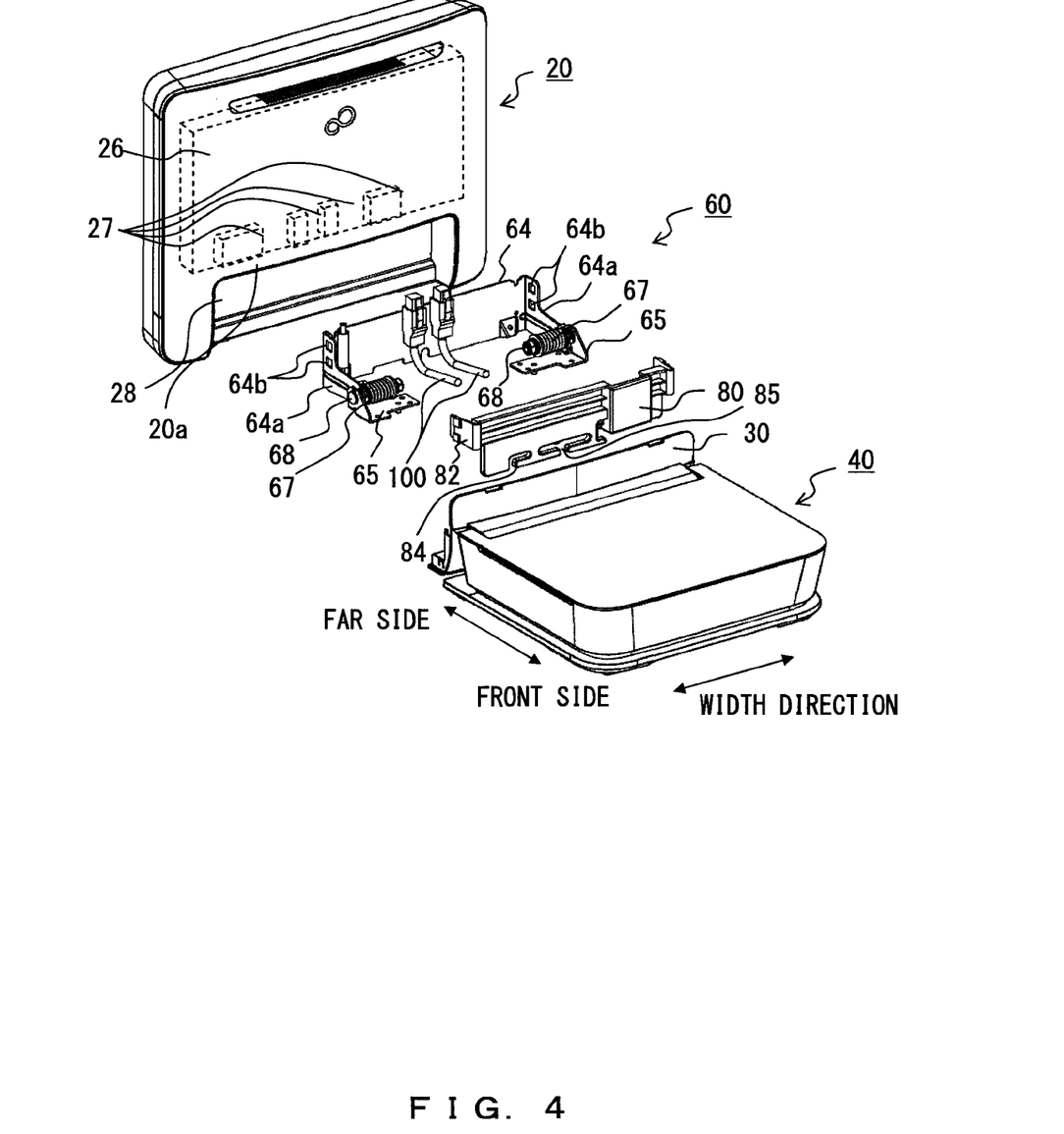
FIG. 4 is an exploded perspective view for explaining a tilting shaft of the POS terminal 10.

FIG. 4 is an exploded perspective view for explaining the tilting shaft of the POS terminal 10. FIG. 4 shows a state when the tilt hinge 60 and the cable holder 80 have been removed from the base unit 40 and the main body unit 20.

FIG. 4 shows the main body unit 20, the tilt hinge 60, the cable holder 80, and the base unit 40 sequentially starting from the far side to the near side in the view.

The main body unit 20 is in a standing state. A connector accommodation portion 28 is formed, at the lower end of the main body unit 20, as a space to allow the attachment of the tilt hinge 60 and the cable holder 80 and the passage of the cables 100. In this example, a status without the cables 100 is shown. On the upper portion of the connector accommodation portion 28, connectors 27 mounted on the motherboard 26 are arrayed along the width direction as indicated by the dashed line.

The tilt hinge 60 includes hinge A64 and hinge B65, torsion springs 67, and tilting shafts 68. The hinge A64 is a plate shaped member that is long in the width direction, and has, at the right and left ends thereof, side portions 64a projecting forward. The hinge A64 is incorporated into the connector accommodation portion 28, and is fixed by a screw to the main body unit 20.

The hinge B65 is separated into two parts, each of which is attached to the side portion 65a of the hinge A64.

The two hinges B65 are fixed by screws to two points on the plane of the far side of the base unit 40.

The tilting shaft 68 are fixed to each of the right and left hinges B65. The tilting shaft 68 fixed to the hinge B65 is inserted into a fitting hole formed on the side portion 64a, and the hinge B65 is attached to the hinge A64 in such a manner that the hinge B65 can tilt. The torsion spring 67 is provided around each of the right and left tilting shafts 68, and applies force on the main body unit 20 in the standing direction.

Two quadrangle hole engagement recesses 64b are provided to each of the side portions 64a provided to the right and left hinge A64. The engagement recesses 64b are for determining and keeping the position of the cable holder 80 on the tilt hinge 60.

Also, FIG. 4 shows, as the position of the cables 100, a position at which the cables 100 connected to the connectors 27 actually correspond to the tilt hinge 60.

Figure 5A:
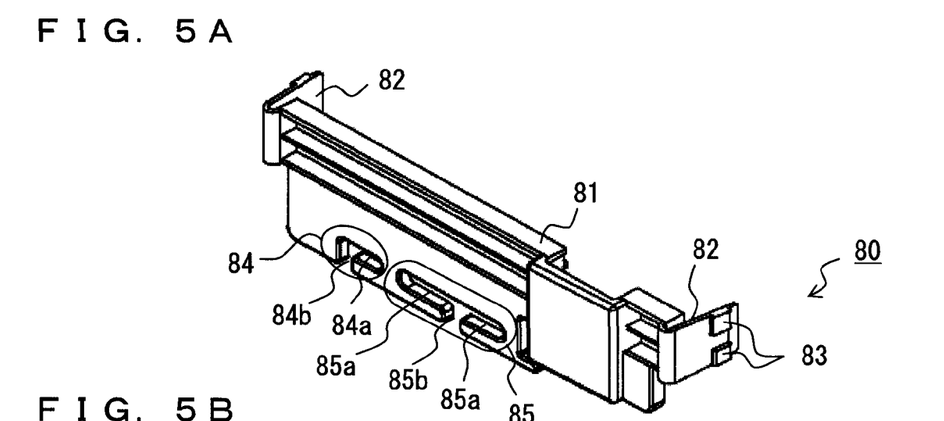
FIG. 5A is a perspective view showing the shape of a cable holder 80.
Figure 5B:
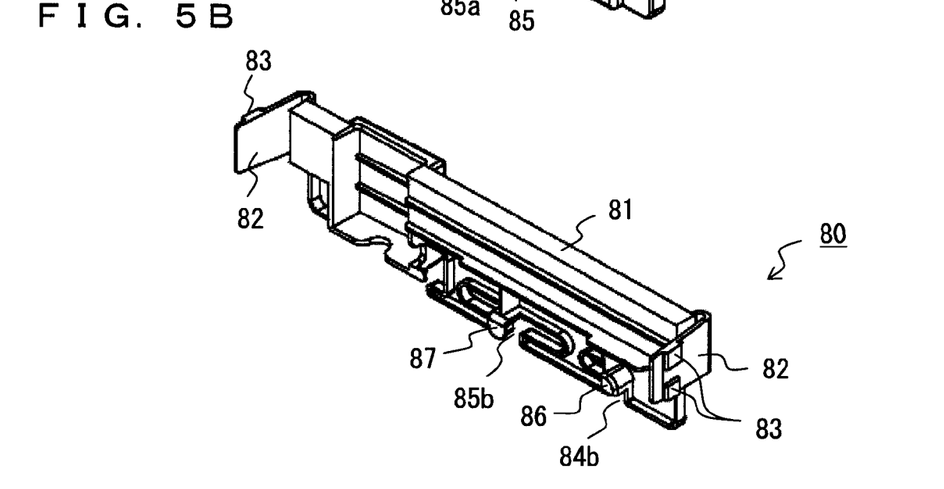
FIG. 5B is a perspective view showing the back plane of the cable holder 80.

Next, the cable holder 80 will be explained by referring to FIGS. 5 and 6 as well. FIG. 5 are perspective views showing the shape of the cable holder 80. FIG. 5A shows the plane of the cable holder 80 shown in FIG. 4 at a different angle. FIG. 5B shows the rear surface of the plane shown in FIG. 5A.

FIGS. 6 are five views showing the shape of the cable holder 80. FIG. 6A is a front view showing the plane of the cable holder 80 shown in FIG. 4. FIG. 6B is a bottom view showing the plane in FIG. 6A as seen from below. FIG. 6C is a rear view showing the plane in FIG. 6A as seen from the back. FIG. 6D is a left side view showing the plane in FIG. 6A as seen from left. FIG. 6E is a right side view showing the plane in FIG. 6A as seen from right.

In the cable holder 80, a portion that is long in the width direction (direction parallel to the tilting shaft) serves as a base unit 81, and arms 82 are provided to the right and left ends of the base unit 81. The cable holder 80 is made by, for example, resin casting. Also, the cable holder 80 may be made of a metal plate, a metal wire, or may be die-cast. On the lower side of the base unit 81 of the cable holder 80, guide A84 and guide B85 for fixing the position of the cable 100 are set.

The guide A84 is set at a position on the left side of the base unit 81 in the figure, and is a hole that is narrow and long in the width (horizontal) direction to extend from the left end of this hole to the bottom of this hole to open. The hole that is narrow and long in the width direction is a guide hole 84a serving as a guide of the cables 100 in practice. The hole extending from the left end to the bottom to the opening is an introduction hole 84b through which the cables 100 are passed. It is desirable that the width of the holes be slightly greater than the diameters of the cables 100 so that the cables 100 can move in the holes.

Figure 6A:
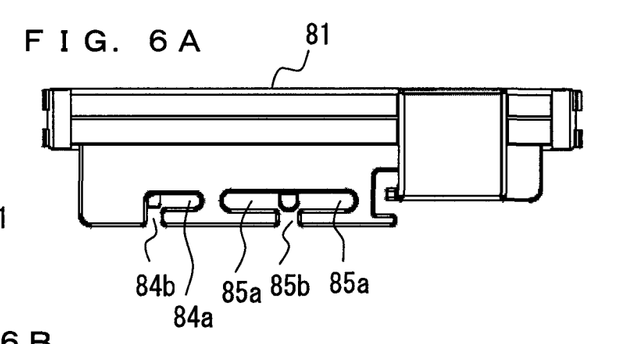
FIG. 6A is a front view of the cable holder 80.

An intercept-shaped stopper A86 is provided deeper than the left end of the guide hole of the guide A84 at which the guide hole 84a and the introduction hole 84b cross each other (FIG. 5B and FIG. 6A). The stopper A86 is a locking unit to temporarily lock the movement of the cables so that the cables 100 that have entered the guide hole 84a passing through the introduction hole 84b are not able to come back out easily.

The guide B85 is provided at the center of the base unit 81 in the figure, and is a hole that is narrow and long in the width direction (horizontal direction) and a hole that extends to the bottom at the center portion of the narrow and long hole so as to open. It is desirable that the hole be slightly larger than the diameter of the cables 100 similarly to the guide A 84 so that the cables can move within the hole.

Also in the guide B85, the hole that is narrow and long in the width direction (horizontal direction) serves as the guide hole 85a, and the hole extending to the bottom at the center so as to open serves as the introduction hole 85b. An intercept-shaped stopper B87 is provided deeper than the position at which the guide hole 85a and the introduction hole 85b cross each other (FIG. 5B and FIG. 6A). Similarly to the stopper A86, the stopper B87 is a locking unit to prevent the cables 100 that have entered from being released.

Figure 6B:
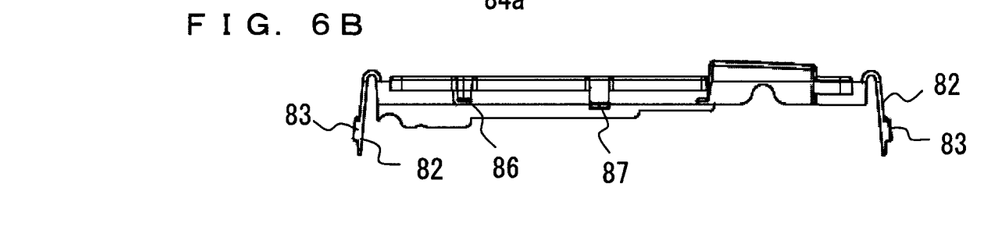
FIG. 6B is a bottom view of the cable holder 80.
Figure 6C:
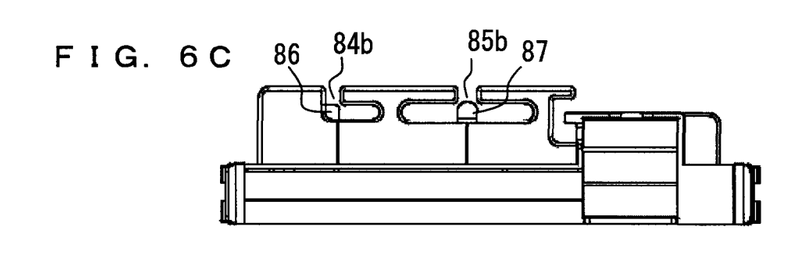
FIG. 6C is a back view of the cable holder 80.
Figure 6D:
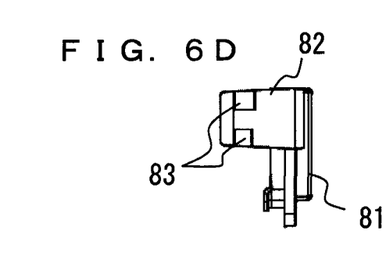
FIG. 6D is a left side view of the cable holder 80.
Figure 6E:
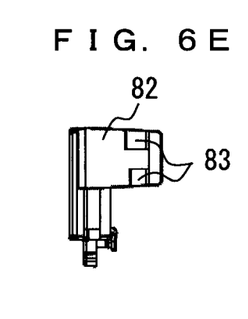
FIG. 6E is a right side view of the cable holder 80.

Also, ribs are appropriately provided to some points on the base unit 81 in order to secure rigidity. As shown in FIG. 6B, the arms 82 are provided to the right and left ends of the base unit 81 in a cantilevered manner. Each of the right and left arms 82 is provided at an angle opening outward (95 degrees for example) with respect to the base unit 81. At the tip of each arm 82, engagement convex portions 83 are provided. The engagement convex portion 83 fits with the engagement recess 64b provided to the hinge A64.

When the cable holder 80 is attached to the main body, the right and left arms 82 of the cable holder 80 are deformed elastically inward so that the cable holder 80 is attached to the hinge A64. The engagement convex portions 83 fit with the engagement recesses 64b, and the cable holder 80 is held by the hinge A64 (the tilt hinge 60). Thereby, the cable holder 80 can be attached to the tilt hinge 60 without using screws, making attachment and removal easy.

The connector cover 30 for covering the connector accommodation portion 28 is shown at a position deeper than the base unit 40. Only part of the connector cover 30 is shown. When seen from the base unit 40, the cable holder 80 and the tilt hinge 60 set in the connector accommodation portion 28 are masked by the connector cover 30.

Figure 7:
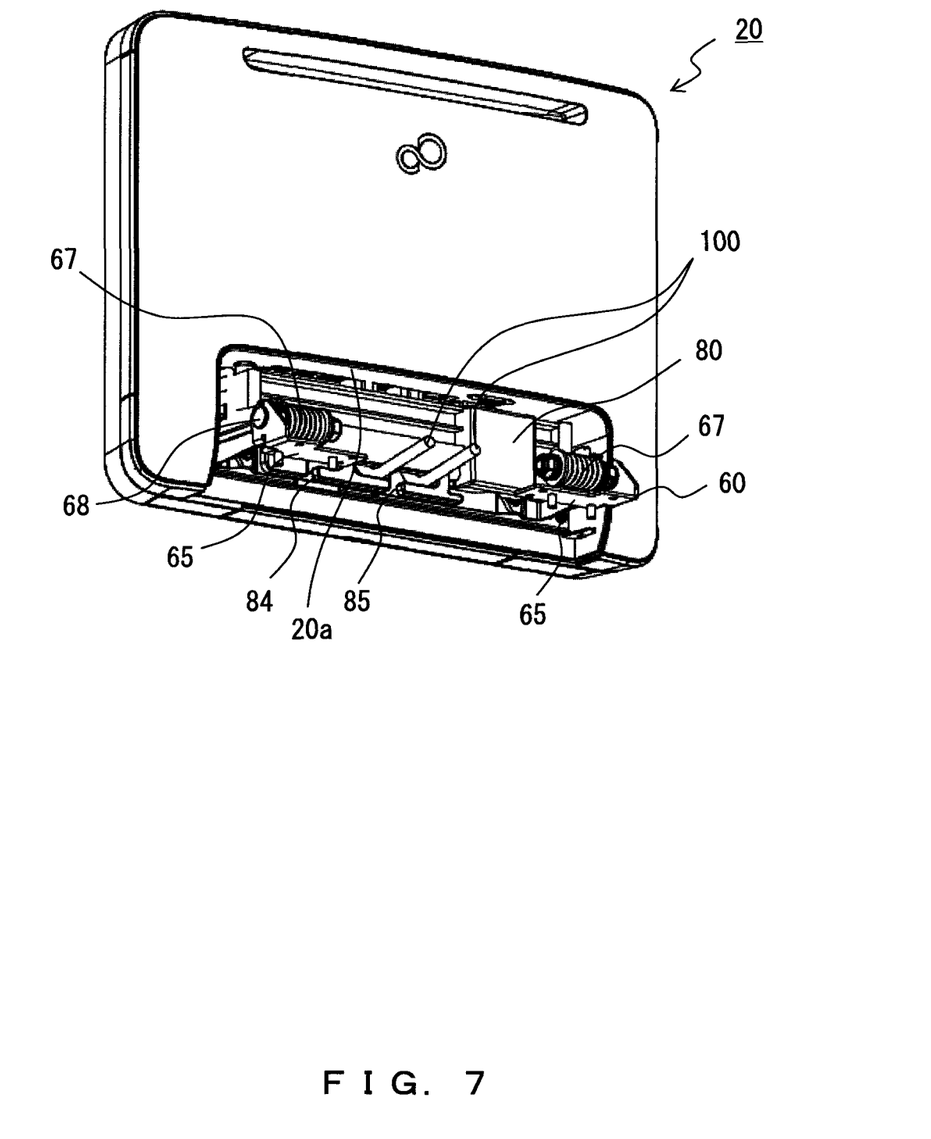
FIG. 7 is a perspective view showing a state in which a tilt hinge 60 and part of the cable holder 80 of the main body unit 20 are exposed.

FIG. 7 is a perspective view showing a state, seen from below, in which the tilt hinge 60 and part of the cable holder 80 of the main body unit 20 are exposed. This is a state in which the base unit 40 has been removed from the main body unit 20, and the connector cover 30 has been removed from the connector accommodation portion 28. To the right and left of the tilt hinge 60 is the hinge B65, which has been removed from the base unit 40. The hinge B65 is L shaped, and has a base portion to be attached to the base unit 40, and a wall vertical with respect to the base portion. An end of the tilting shaft 68 is supported by the wall, and a torsion spring is provided around the tilting shaft 68. The hinge B65 is approximately symmetric.

The guide A84 and the guide B85 in the cable holder 80 attached to the hinge A64 of the tilt hinge 60 are shown in this figure. One of the cables 100 passes through each of the right and left holes of the guide hole 85a of the guide B85. Also, the above described power source cable connecting the main body unit 20 and the base unit 40 receives the forming in a similar manner.

Figure 8:
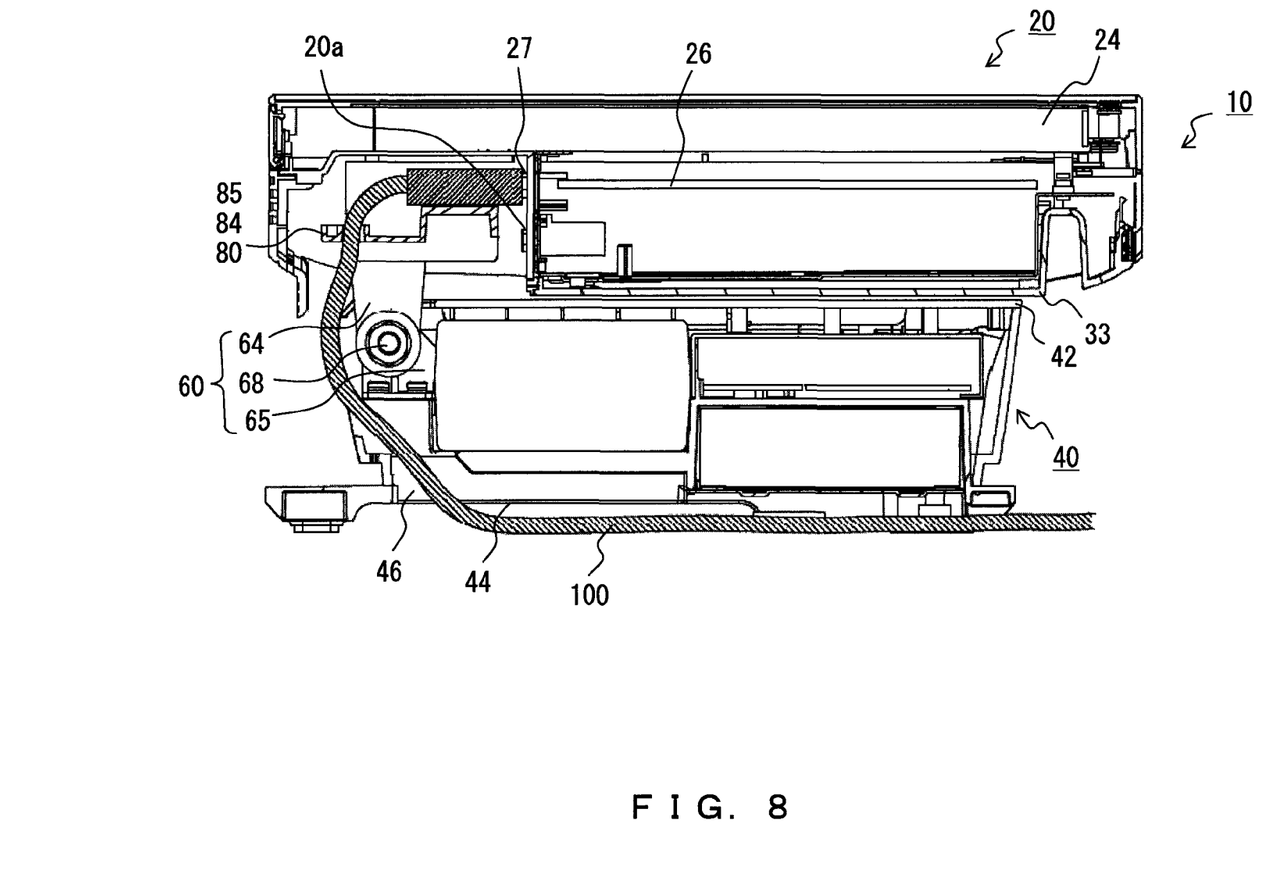
FIG. 8 is a sectional view showing the POS terminal 10 having the main body unit 20 folded into the base unit 40.

FIG. 8 is a sectional view showing the POS terminal 10 having the main body unit 20 folded into the base unit 40.

The main body unit 20 has been tilted in the clockwise direction by ninety degrees about the tilting shafts 68 of the tilt hinge 60. The main body unit 20 is folded into the base unit 40 until the plane of the rear cover 33 comes to a position immediately before the position at which the rear cover 33 and the top cover 42 come into close contact. The motherboard 26 has become approximately parallel to the bottom plane unit 44. Note that the main body unit 20 is locked by locking means (not shown) at a position at which the main body unit 20 has been folded into the base unit 40.

As will be recognized by comparing this figure and FIG. 2, the route of the cables 100 changes in accordance with the tilting caused by the folding of the main body unit 20 or the like. Also, there is a prescribed space inside the POS terminal 10 to allow the cables 100 to move freely so that the tilting does not apply stress to the cable 100 or so that a smooth feeling is felt when the main body unit 20 is tilted.

The cable holder 80 is provided in the vicinity of the connector 27 so that the position at which the cables 100 immediately coming out of the connector 27 pass through the cable holder 80 is fixed by the guide A84 and the guide B85. The guide A84 and guide B85 serve as a kind of node against the cables 100 when the cables 100 are moved by tilting or the like. Thereby, when the cables 100 are moved by tilting, the movement of the cables 100 is limited to movement around the connector, and accordingly it is possible to prevent the cables 100 from being moved and thereby causing tangling or the like.

Further, the cable holder 80 is provided in the vicinity of the connector 27, and a space sufficient to allow free movement of the cables 100 after getting out of the cable holder 80 is secured, and thereby it is possible to avoid deterioration in the smoothness in tilting or avoid applying too heavy a stress to the cables 100.

Effects achieved at least by the above embodiments are as follows:

(1) Because the cable holder for fixing the position of the cables 100 is provided in the vicinity of the connector of the main body that can be tilted by folding or the like, it is possible to prevent a situation where movement of the cables during tilting applies stress to the connector and thereby breaks the connector. It is not necessary to temporarily remove the cables in order to protect the connector for each tilting operation during the folding of the main body.

(2) Because the cable holder is provided in the vicinity of the connector of the main body that can be tilted, it is possible to avoid a situation where an internal space allowing free movement of the cables 100 is narrowed and thereby deteriorating the smoothness of the tilting or applying intense stresses to the cables 100.

(3) Because the cable holder is provided in the space between the tilting axes at the right and left ends of the tilting hinge, providing the cable holder does not require additional space.

(4) Because the cantilevered arms are provided to both ends of cable holder, screws are not necessary for attaching.

(5) Because a locking unit (stopper) is provided at the position at which the guide hole and the introduction hole cross each other, it is possible to prevent the cables from moving and dropping from the guide during use.

While a POS terminal has been used for explanations in the above embodiment, the present invention can also be applied to information processing apparatuses used for financial services, securities businesses, or communication services as a matter of course.

The present invention is not limited to the above described embodiments, and can be embodied with modifications to constituents without departing from the spirit of the invention. Also, various inventions may be achieved by appropriate combinations of a plurality of constituents disclosed in the above embodiments. For example, all the constituents disclosed in the embodiments may be combined appropriately. Further, constituents that are disclosed in different embodiments may be combined appropriately. As a matter of course, various modifications and applications are possible without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus connected to a peripheral device through a cable, comprising:
   a main body unit having a connector on a bottom portion of the main body unit;
   a base unit that is set on the main body unit in a tiltable manner, and is connected to the connector of the main body unit so that the cable connected to the connector of the main body unit and directed to the peripheral device is passed through to an inside;
   a tilting unit that turns the main body unit about a vicinity of the bottom portion of the main body unit with respect to the base unit when tilting is performed; and
   a cable holder that defines a position of the cable in a vicinity of the connector, and suppresses movement of the cable accompanying the tilting operation between the defined position and the connector; wherein:
   the cable holder is attached to the tilting unit.

2. The information processing apparatus according to claim 1, wherein:
   the tilting unit is configured to be narrow and long in a tilting shaft direction, and has tilting shafts for tilting the base unit at both ends of the tilting shaft direction; and
   the cable holder is arranged between the tilting shafts at both ends.

3. The information processing apparatus according to claim 2, wherein:
   the tilting unit provides, at positions of both ends, side plates for attaching the tilting shafts in a direction orthogonal to the tilting shaft direction; and
   the cable holder has arms that fit with the side plates by means of elastic deformation.

4. The information processing apparatus according to claim 1, wherein:
   the cable holder has an introduction hole for introducing the cable to the cable holder as a through hole for defining a position of the cable, and a guide hole for defining, continuously with the introduction hole, a position of a cable, and a locking unit for temporarily locking movement of the cable at a position at which the introduction hole and the guide hole cross each other.

5. The information processing apparatus according to claim 1, wherein:
   the information processing apparatus is a POS terminal.

* * * * *